United States Patent
Ollis et al.

(10) Patent No.: US 6,753,004 B2
(45) Date of Patent: Jun. 22, 2004

(54) BIODEGRADABLE FISHING LURE AND MATERIAL

(75) Inventors: Howard D. Ollis, Columbus, GA (US); Salvador Diaz-Verson, Jr., Columbus, GA (US); Leonard N. Bell, Auburn, AL (US); Jean O. Weese, Opelika, AL (US); Cheng I. Wei, Stillwater, OK (US); Russell A. Wright, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/218,667

(22) Filed: Aug. 14, 2002

(65) Prior Publication Data

US 2003/0066231 A1 Apr. 10, 2003

Related U.S. Application Data

(60) Provisional application No. 60/318,234, filed on Sep. 4, 2001.

(51) Int. Cl.[7] .............................................. A01N 25/10
(52) U.S. Cl. ...................... 424/410; 424/84; 424/418; 424/421; 424/485; 424/488; 424/442; 426/2; 43/42; 43/42.24; 43/42.37
(58) Field of Search ...................... 426/1; 43/42, 42.24, 43/42.37; 424/442, 84, 485, 488, 410, 418, 421

(56) References Cited

U.S. PATENT DOCUMENTS

| | | |
|---|---|---|
| 3,607,294 A | 9/1971 | Ernstrom |
| 3,876,803 A | 4/1975 | Stephan et al. |
| 4,076,846 A * | 2/1978 | Nakatsuka et al. ........... 426/62 |
| 4,245,420 A * | 1/1981 | Carr .......................... 43/42.06 |
| 4,362,748 A * | 12/1982 | Cox ............................... 426/1 |
| 4,375,481 A | 3/1983 | Kuwabara et al. |
| 4,664,857 A | 5/1987 | Nambu |
| 5,089,277 A | 2/1992 | Prochnow |
| 5,197,219 A | 3/1993 | Cook, Jr. et al. |
| 5,266,323 A | 11/1993 | Guthrie et al. |
| 6,171,632 B1 | 1/2001 | Lanter et al. |
| 6,174,525 B1 | 1/2001 | Kelley |

OTHER PUBLICATIONS

"Berkley Power Naturals", Berkley Fishing What's New (web page), Jul. 1, 2002; 2002 Berkley Fishing.

* cited by examiner

*Primary Examiner*—Neil S. Levy
(74) *Attorney, Agent, or Firm*—Gardner Groff, P.C.

(57) ABSTRACT

Natural, biodegradable compositions are described as well as methods for their manufacture. Fishing lures and other items made of the biodegradable materials disintegrate over time in fresh or salt water to reduce pollution. The materials are digestable by fish and other aquatic animals, reducing potential harm to the animal from ingesting a fishing lure or other item made from the natural biodegradable materials disclosed. Because the material is digestable, it can also be used as a food source or supplement for fish and aquatic animals.

19 Claims, 1 Drawing Sheet

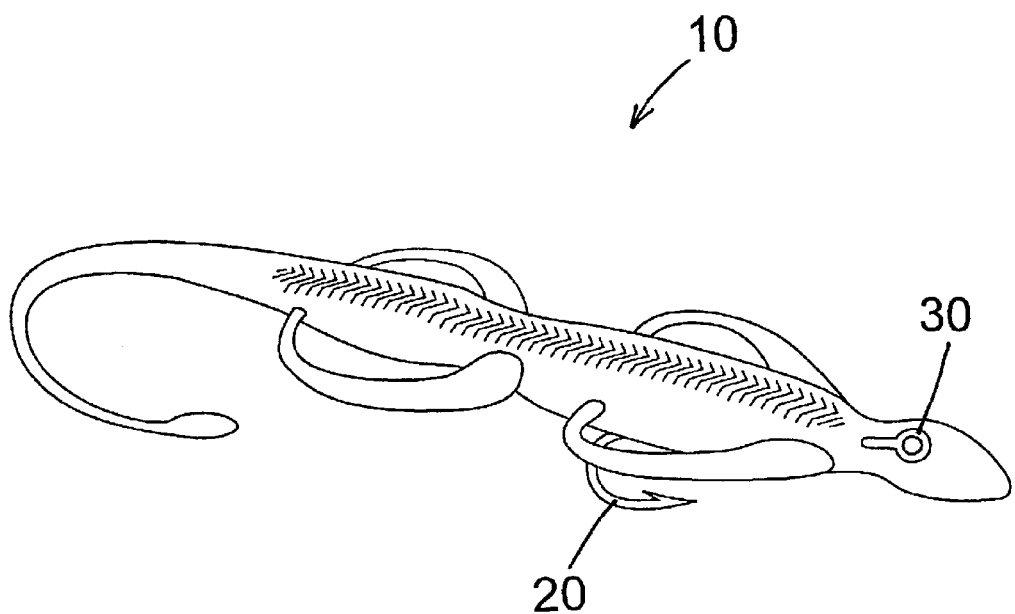

BIODEGRADABLE FISHING LURE AND MATERIAL

CROSS-REFERENCE TO RELATED APPLICATION

This application claims the benefit of U.S. Provisional Patent Application Serial No. 60/318,234, filed Sep. 4, 2001, which is hereby incorporated herein by reference in its entirety for all purposes.

FIELD OF THE INVENTION

The present invention relates generally to the field of materials and manufacturing, and more particularly to biodegradable compositions and processing methods for the production of items including biodegradable fishing lures.

BACKGROUND OF THE INVENTION

People love to fish. Whether they do it for recreation, competition, relaxation, food or family fun, fishing has been a popular activity for years. And the number of fishermen continues to grow as new generations of fisherman get hooked on the sport. As a result of this continued and growing interest, a large and worldwide industry has developed in the manufacture and marketing of improved tackle and equipment. One particular segment of the sport that enjoys great popularity is bass fishing. The selection of an effective bait or lure is one of the more important aspects of success and enjoyment in any type of fishing, and is especially so in bass fishing.

The vast majority of artificial fishing lures currently on the market are produced from synthetic non-biodegradable polymers (i.e., rubber, plastic and the like). If such a lure is released from the hook and/or line during fishing, it may be consumed by a fish and remain undigested in its gastrointestinal tract, or it may remain unchanged in the environment as a pollutant. In addition, the manufacture of synthetic rubber or plastic lures typically involves the use of petroleum-based products with numerous waste byproducts that may further harm the environment. As the number of fisherman on the water increases, the negative impact of these artificial non-biodegradable plastic lures on the environment becomes more and more significant.

The provision of an effective biodegradable fishing lure produced from natural and/or food grade ingredients would help prevent or reduce the harm to the earth's ecosystem resulting from the manufacture and use of artificial fishing lures. However, most fishermen are unlikely to switch to a new type of lure unless it has the proper feel and appearance. And, most importantly, the new lure must be effective in catching fish. Until now, the formula for a natural and biodegradable material suitable for use in the production of effective fishing lures has proven to be elusive. For example, certain previous compositions for the production of fishing lures have been claimed to be biodegradable, but were not made from naturally occurring ingredients, and/or lacked the physical properties of currently employed soft plastic recreational fishing lures that are desirable for commercial utility. Other compositions that have been claimed to be biodegradable are found to lack sufficient ability to biodegrade in the environment, and/or to be cleared from the gastrointestinal tract of a fish within an acceptable period of time.

Also, products formed from previously known compositions that are claimed to be biodegradable are often incapable of withstanding various fishing actions such as jigging and repeated casting that subject a bait or lure to substantial or repeated stresses or impacts. Other previously known materials that have been claimed to be biodegradable require costly and therefore commercially disadvantageous production techniques such as curing by freezing for several hours after molding. Other known products do not have the physical geometry, cohesive strength, elasticity, or flexibility required to produce an efficient fishing lure. Additionally, and quite importantly to fishermen, actual fishing trials demonstrate that desirable physical properties and efficacy in catching fish are lacking in many previously known products. For example, the physical properties of certain previously known materials prevent the material from being formed into lures of various popular shapes (e.g., fish, lizards, worms, etc). The "action" required of lures for bass fishing would be severely limited by lures produced from such materials.

Thus, it can be seen that needs exist for improved biodegradable materials and methods for producing fishing lures. It is to the provision of materials and methods meeting these and other needs that the present invention is primarily directed.

SUMMARY OF THE INVENTION

Example embodiments of the present invention provide a low-cost, biodegradable fishing lure or bait composed of natural and/or food grade ingredients and a method for its production. Specifically, a biodegradable fishing lure has been developed which will disintegrate over time in fresh or salt water environments, digest quickly in the gastrointestinal tract of aquatic species, and be non-toxic to plants and animals. Example embodiments of present invention provide a biodegradable fishing lure that withstands typical rigging, casting, trolling, and other fishing actions. Embodiments of the invention successfully withstand typical storage conditions in fishing environments such as tackle boxes and boats. Additionally, embodiments of the invention produce a natural, biodegradable fishing lure at a competitive price, and having the demonstrated ability to catch fish.

Example embodiments of the invention have also been discovered to provide a number of surprising advantages over presently known artificial lures. For example, as the lure slowly dissolves during use, a "chum-trail" of particles follows the lure through the water, allowing fish to follow and locate the lure, potentially increasing the number of strikes. In addition, the natural, biodegradable material of example embodiments of the invention can serve uses other than fishing lures, including use as a transitional fish food for transitioning farm-raised fish, shrimp, crayfish or other animals from live foods to pelletized foods. Vitamins, minerals and/or other additives can be added to the composition without significantly affecting the material's look and feel. Waste products from the manufacturing process can be easily recycled, composted, and/or even used as a food source for fish and other animals. Also, because the material of example embodiments of the invention is comprised of natural and/or food-grade ingredients, a wide array of biological organisms, such as insects and other animals, bacteria, fungi and the like, may consume and at least partially digest the material, thereby speeding the breakdown of discarded objects made of the material. And because they do not include petrochemical solvents and plasticizers, lures made according to example embodiments of the invention do not tend to dissolve tackle box trays in the manner in which many existing artificial worms and other baits can.

In one aspect, the invention is a biodegradable fishing lure comprising a body formed of a flexible and resilient material. The material preferably includes at least one carbohydrate and at least one protein, and is biodegradable in freshwater and in saltwater. The body is preferably formed into the general shape of a natural food source of a fish.

In another aspect, the invention is a biodegradable material. The material preferably includes at least one natural carbohydrate, wherein the natural carbohydrate is a monosaccharide, a disaccharide, a polysaccharide and/or a starch. The material preferably also includes at least one natural protein, wherein the protein is a gelatin, a casein, a whey, a gluten, a soy protein and/or an albumin. The material preferably also includes at least one water-soluble natural gum.

In yet another aspect, the invention is a biodegradable material including at least one natural carbohydrate and at least one natural protein. The material is preferably flexible and resilient, has an Instron 5 hardness of between about 1 kg to about 4 kg, and allows at least about 25% elongation before breakage.

In still another aspect, the invention is a biodegradable fishing lure including a body formed of a material comprising at least one natural carbohydrate and at least one natural protein, the material being digestable by a fish; and at least one hook attached to the body of the lure.

In yet another aspect, the invention is a process for producing a biodegradable material. The process preferably includes mixing components comprising at least one natural carbohydrate and at least one natural protein to form a composition; molding the composition into a fishing lure shape; and curing the molded composition to produce a material that is flexible and resilient, and that allows at least about 25% elongation before breakage.

These and other aspects, features and advantages of the invention will be understood with reference to the drawing FIGURES and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWING FIGURE

The drawing FIGURE shows a lure constructed of a biodegradable material according to an example embodiment of the present invention.

DETAILED DESCRIPTION

The present invention may be understood more readily by reference to the following detailed description of the invention taken in connection with the accompanying drawing FIGURES, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In example embodiments, the present invention is a biodegradable material comprising naturally occurring carbohydrates and proteins. The components of the material are preferably selected from natural carbohydrates such as sugars including monosaccharides, disaccharides and/or polysaccharides, glucose, fructose, sucrose, lactose, maltose, cellobiose, glycerol, starches including corn starch, wheat starch, rice starch, potato starch, water-soluble gums including xanthan gum, carrageenan, guar gum, locust bean gum, arabinogalactans, gum Arabic, agar, pectin, etc.; and from natural proteins such as casein, whey protein, gelatin, gluten, soy protein, albumin, etc. As used herein, "natural" and the like includes materials occurring in nature, as well as man-made or synthesized materials identical to materials occurring in nature.

In preferred form, the biodegradable material of the present invention comprises at least one sugar, at least one carbohydrate polymer, and at least one protein; in which the percentage content of sugar, carbohydrate polymer, and protein components range from about 50%–90%, about 2%–15%, and about 15%–40%, respectively, on a solids basis. In further preferred embodiments, the biodegradable material of the present invention comprises natural sugar, natural carbohydrate polymer, and natural protein components in the ranges of about 50%–90%, about 5%–15%, and about 15%–30%, respectively, on a solids basis.

Salts, food grade preservatives, flavoring agents, nutrients, vitamins, minerals, and/or other additives are optionally also included. Attractants or feeding stimulants are optionally also included, such as natural diet enhancers including hydrolyzed fish proteins, fish oil, fish meal, ground crustaceans, ground mussels, fish powder, fruit, spices, garlic, garlic oil, extracts and the like; synthetic diet enhancers including mixtures of neutral L-amino acids, Betaine, Nucleotides (e.g., inosine, inosine-5-monophosphate), Sulfonium compounds (e.g., dimethylthetin, dimethylpropiothetin) and the like; and/or visual attractants including metallized or metallic glitter, plastic and Mylar glitter, and/or food grade colors. Such attractants are optionally included in the biodegradable material of the present invention in an amount of from about 2% to about 10%, or less, on a dry weight basis.

In particular example embodiments, the biodegradable material of the present invention includes a blend of water, sucrose, gelatin, glycerol, Kappa carrageenan, potassium chloride, a preservative and a food coloring. In further preferred embodiments, the sucrose, gelatin, glycerol, Kappa carrageenan, potassium chloride, and potassium sorbate ingredients are present in ranges of from about 30%–70%, about 3%–35%, about 20%–50%, about 2%–6%, about 0.1%–2.0%, and about 0.1%–2.0%, respectively, on a solids basis. In still further preferred embodiments, the material further comprises trace amounts of a fish attractant/scent.

In other particular example embodiments, the biodegradable material of the present invention includes a blend of water, sucrose, gelatin agar, calcium chloride, starch, corn syrup, glycerin and food coloring. In further embodiments, the biodegradable material of the present invention includes a blend of sucrose, gelatin, sodium alginate, locust bean gum, calcium chloride, starch, corn syrup, glycerin, sodium benzoate and sodium metaphosphate, preferably present in ranges of from about 5%–15%, about 10%–30%, about 1%–5%, about 1%–5%, about 0.1%–1%, about 1%–5%, about 30%–50%, about 1%–5%, about 1%–3%, and about 1%–3%, respectively, on a solids basis. In still further preferred embodiments, the material further comprises a fish attractant/scent.

In still other particular example embodiments, the biodegradable material of the present invention includes a blend of sucrose, gelatin, sodium alginate, calcium chloride, starch, sodium metaphosphate, corn syrup, glycerin and food coloring. In still further preferred embodiments, the material further comprises a fish attractant/scent.

In another embodiment, and with reference to the drawing FIGURE, the present invention is a fishing lure 10 made from one or more of the biodegradable materials disclosed herein. The lure 10 is preferably formed into the shape of a natural food source of the species of fish pursued. For example, in the depicted embodiment, the lure 10 is formed in the shape of a lizard. Alternate embodiments are formed in the shape of a worm, a crawfish, a baitfish, a frog, a fish egg, or another type of animal or plant matter. The lure 10 preferably includes or receives one or more fish hook(s) 20, preferably including a barbed end for resisting release by a hooked fish. The lure 10 and/or the hook 20 preferably include an eyelet 30 or other connection point for securing the lure/hook to a leader or to a fishing line.

Still other embodiments of the invention include the use of one or more of the biodegradable materials disclosed herein as a food for fish, shrimp or other aquatic animals. The material is particularly suited for use as a transitional fish food for fish raised in farms and aquaculture facilities. Newly-hatched fish may initially eat live foods, and then be transitioned over to eating pelletized foods. The material of the present invention advantageously hydrates to a soft, palatable food source suitable for transitioning the fish from live food sources to pellets. Additives including vitamins, minerals, growth hormones and the like are optionally included in the food material of the present invention.

The invention also comprises a natural biodegradable material, as described herein, used as a time-release coating for an object. For example, pieces of food products, drugs, fertilizers or other delivered materials are coated with a layer of the natural biodegradable material described herein. The coated material is then consumed by a target organism or delivered to an environment where the coating biodegrades over time to expose and release the delivered material. By selectively controlling the thickness and/or content of the coating layer, the delivery time can be controlled. For example, a quantity of a delivered material can be provided with coatings of varying duration, whereby different portions of the delivered material are released at different times. The invention also includes the delivered material coated with a natural biodegradable material as described herein, and a method of coating a delivered material with the natural biodegradable material.

In still other embodiments, the invention includes objects such as packaging and containers formed from a biodegradable material as described herein. For example, boating supplies, fishing tackle, and various other aquatic-related products may be sold in a biodegradable container or package that will naturally disintegrate over time if accidentally or purposefully disposed in or around a body of water, thereby reducing aquatic pollution. Food or beverage packaging, such as for example, six-pack "rings" produced of a biodegradable material that will naturally disintegrate in water, advantageously eliminate a potential source of pollution and injury to fish and other aquatic animals.

Other example embodiments of the invention include various items of aquatic equipment that are formed from the biodegradable material of the present invention. For example, marker buoys used to locate crab or lobster traps and floats used for jug-fishing can be formed of a biodegradable material that will disintegrate if left in the water for longer than a predetermined period of time. In this manner, if such an item is forgotten, lost or abandoned, it will not remain in the water indefinitely.

Still other embodiments of the invention include an attractant or a food product for fish and/or other aquatic animals that is formed of a digestable biodegradable material comprising naturally occurring carbohydrates and proteins, as described herein. Other embodiments of the invention include methods for producing a biodegradable material comprising naturally occurring carbohydrates and proteins, and methods for producing fishing lures and other items and objects from such a material.

The present invention also includes a method for the manufacture of a fishing lure or other item from one or more of the biodegradable materials disclosed herein. In example embodiments, the method of the present invention preferably includes the mixing of components according to one or more of the formulas disclosed herein, the forming of the composition into various fishing lure shapes using molds, and the curing of the lure to develop its desired physical consistency and characteristics. In preferred and example embodiments, the process utilizes the same type of molds currently used to manufacture typical plastic fishing lures or other plastic items. The process preferably includes placing a liquid composition into an aluminum mold, cooling the mold to approximately 4–30° C. for less than 15 minutes, and releasing the formed lure or other item from the mold. Depending upon the composition, curing at 4° C. for 20–44 hours or as high as 50° C. for 3–5 hours may be required. The rate of curing of the material has been found to be primarily a function of time, temperature and relative humidity in the curing environment. Although the example embodiments described herein have been found to possess adequate curing characteristics at a wide range of typical ambient temperature and humidity, it may be desirable in some instances to provide a climate controlled manufacturing and curing facility to expedite production. Alternatively, the curing time can be adjusted depending on the existing ambient conditions.

The progress of the curing process can be monitored by measuring the weight loss of the material over time, and/or by measuring the hardness and/or other characteristics of the material. Upon reaching the desired state of curing, the lure or other object is preferably spray-coated with a natural oil to prevent overdrying and maintain the desired feel and material consistency. Alternatively, the object is packaged and sealed upon reaching the desired state of curing to prevent overdrying and maintain the desired feel and material consistency. In example embodiments of the invention, lures having acceptable feel, durability and biodegradability were tested using an Instron testing apparatus with a load range of 5 and a speed of 200 mm/minute. A lizard-shaped lure was gripped just below the neck and above the hind legs. The material was found to allow at least 25% elongation before breakage. Most preferably, the material allowed at least 100% elongation before breakage. Fracture preferably occurred after the force applied reached at least about 1–1.5 kg. Compression testing of the lure material indicated a hardness of about 1–4 kg. While materials having characteristics outside of these ranges can be achieved by increasing or decreasing the degree of curing, these characteristics have been shown to produce a lure having a suitable combination of feel, action or "wiggliness" and durability on the hook for good fishing results, and to readily biodegrade and/or digest in the digestive tract of fish or other animals.

Fishing lures and other items produced according to preferred and example embodiments of the present invention can quickly biodegrade in the environment and in the stomachs of fish species. Experiments conducted using example embodiments of the invention show typical biodegradation rates of less than 3 months in the environment, and swallowed lures disappeared from fish gastrointestinal tracts within a week. Prototype lures according to example embodiments of the invention were placed in 1 mm mesh Nitex bags, and submerged in approx. 0.5 meter deep water in the littoral zone of a fisheries pond. Temperatures ranged from about 19–28° C., and averaged about 25° C. After 45 hours, some lures were partially degraded and others were mostly degraded. After 10 days, some lures were substantially completely degraded and others were mostly degraded. After 30 days, all of the lures were substantially completely degraded.

The present invention will be further understood with reference to the following examples:

EXAMPLE 1

A formulation of the following composition was prepared:

| Component | Amount |
|---|---|
| Water | 100 g |
| Sucrose | 30.3 g |
| Gelatin (200–300 bloom) | 3.0 g |
| Glycerol | 40.6 g |
| Kappa carrageenan | 2.0 g |
| Potassium chloride (KCl) | 0.44 g |
| Potassium sorbate | 0.48 g |
| Food coloring | trace |

Manufacturing Procedure: The mixing vessel was charged with the water, KCl, and gelatin at room temperature. After thorough agitating, the mixture was heated with continued stirring. The carrageenan was added next, followed by the sucrose, glycerol and food coloring. The sorbate was added last. Heating with agitation continued until the temperature reached around 90° C. At this point, all components were completely dissolved in solution and the mixture appeared homogeneous. The hot solution was injected using a syringe into a warm fish-shaped aluminum mold. The mold was then placed into an ice bath for about 10 minutes to get rapid gelation. The solidified lures were removed from the molds. Freshly prepared lures were brittle and did not hook well. Curing by either storing in the refrigerator for three days or heating at 50° C. for 4–5 hours gave a more flexible, tougher lure. However, the resulting lure shrinks by about 50% as compared to the fresh lure.

Once in water, this lure feels slimy, begins to swell, and becomes more "wiggly." This formulation has a melting temperature greater than 60° C. When bass were force fed these lures, their stomach contents showed no signs of the lure after a week.

EXAMPLE 2

A formulation of the following composition was prepared:

| Component | Amount |
|---|---|
| Water | 100 g |
| Sucrose | 20 g |
| Gelatin (200–300 bloom) | 4.0 g |
| Glycerol | 20 g |
| Kappa carrageenan | 2.75 g |
| Potassium chloride (KCl) | 0.66 g |
| Potassium sorbate | 0.5 g |
| Food coloring | trace |

Manufacturing Procedure: The mixing vessel was charged with the water, KCl, gelatin, and carrageenan at room temperature. After thorough agitating, the mixture was heated with continued stirring. Once the temperature reached 65° C., the sucrose, glycerol, sorbate, and food coloring were added. Heating with agitation continued until the temperature reached about 85° C. At this point, all components were completely dissolved in solution and the mixture appeared homogeneous. The hot solution was injected using a syringe into warm aluminum molds to yield fish-shaped and lizard-shaped lures. The molds were placed into an ice bath for about 10 minutes to rapidly obtain a firm gel. The solidified lures were removed from the molds.

Freshly prepared lures were brittle and did not hook well. Curing by either storing in the refrigerator for two days or heating at 50° C. for 4–5 hours gave a more flexible, tougher lure. However, the lure shrinks by about 50%.

Once in water, this lure feels slimy, begins to swell, and becomes more "wiggly." This formulation has a melting temperature greater than 60° C. A fish-shaped lure remained on the hook for 18 casts during a fishing expedition. A second fish-shaped lure caught a small bass.

EXAMPLE 3

A formulation of the following composition was prepared:

| Component | Amount |
|---|---|
| Water | 105 g |
| Sucrose | 50 g |
| Gelatin (200–300 bloom) | 10.0 g |
| Kappa carrageenan | 3.0 g |
| Potassium chloride (KCl) | 0.6 g |
| Potassium sorbate | 0.5 g |
| Powdered fish food | 1.0 g |
| Food coloring | trace |

Manufacturing Procedure: The mixing vessel was charged with the water, KCl, and gelatin, which were stirred at room temperature. After thorough agitating, the mixture was heated with continued stirring. Once the temperature reached about 65° C., the sucrose, carrageenan, and food coloring were added. Heating with agitation continued until the temperature reached about 85° C., after which the sorbate and fish food were added. When all components were completely dissolved in solution and the mixture appeared homogeneous, the hot solution was injected using a syringe into a warm aluminum molds to yield fish-shaped and lizard-shaped lures. The mold was placed into an ice bath for about 10 minutes to rapidly obtain a firm gel. The solidified lures were removed from the molds. Freshly prepared lures were brittle and did not hook well. Curing by storing in the refrigerator for two days gave a more flexible, tougher lure. Although the lure shrinks by about 50%, it hooks well and swells when hydrated during fishing.

Nine lizard-shaped lures were used on a fishing expedition. Lures were placed on the hook via Texas-style rigging. Of the nine lures used, seven received bites, and 6 bass were hooked. Two of the hooked bass were reeled in, and four (allegedly "the big ones") got away.

EXAMPLE 4

A formulation of the following composition was prepared:

| Component | Amount |
| --- | --- |
| Water | 100 g |
| Sucrose | 50 g |
| Gelatin (200–300 bloom) | 15.6 g |
| Kappa carrageenan | 3.0 g |
| Potassium chloride (KCl) | 0.6 g |
| Potassium sorbate | 0.6 g |
| Powdered fish food | 2.0 g |
| Food coloring | trace |

Manufacturing Procedure: The water was brought to a boil while the other ingredients were dry blended. The mixing vessel was charged with the hot water. The dry ingredients were added to the hot water with lots of mixing. Food coloring was added. Heating with agitation continued until the temperature reached about 90° C. When all components were completely dissolved in solution and the mixture appeared homogeneous, the hot solution was injected using a syringe into warm aluminum molds to yield fish-shaped and lizard-shaped lures. The mold was placed into an ice bath for about 10 minutes to rapidly obtain a firm gel. The solidified lures were removed from the molds. Freshly prepared lures were brittle and did not hook well. Curing by storing in the refrigerator for 22 hours gave a more flexible, tougher lure. This lure shrinks by about 20% in size and 30% in weight.

Thermal analysis by differential scanning calorimetry showed no melting peak below 100° C. (212° F.). A lure stored for over two days at 60° C. (150° F.) maintained its shape. Instron testing indicated the lures were of similar strength to rubber lures, but were less flexible.

The lure hooks well, becomes slimy when moistened, swells when hydrated, and becomes more "wiggly" during fishing. Depending upon length of time for each cast and the strength of each cast, lizard lures typically withstood 10–20 casts before losing a leg or tail.

The biodegradability of this composition was evaluated by placing a fish-shaped lure into a porous container, which was subsequently placed into a ten gallon fish tank containing pond water. A filterless pump provided slight agitation to the water. This fish tank was designed to mimic the true aquatic environment. A second "disintegration" study was conducted by placing two lizard-shaped lures into the same apparatus. Monitoring the lures over time, it was seen that the lures or lure components were no longer detectable after 1 month.

EXAMPLE 5

A formulation of the following composition was prepared:

| Component | Amount |
| --- | --- |
| Water | 40 g |
| Sucrose | 10 g |
| Gelatin (200–300 bloom) | 14.2 g |
| Agar | 2.0 g |
| Calcium chloride ($CaCl_2$) | 0.5 g |
| Starch | 2.0 g |
| Corn Syrup | 25 g |
| Glycerin | 2 g |
| Food coloring | trace |

Manufacturing Procedure: All ingredients are weighed prior to processing. The water was brought to a boil while the other ingredients were dry blended. The mixing vessel was charged with the hot water. The dry ingredients were added to the hot water with lots of mixing. Food coloring was added. Heating with agitation continued until the temperature reached about 90° C. When all components were completely dissolved in solution and the mixture appeared homogeneous, the hot solution was injected using a syringe into an aluminum mold to yield fish-shaped and lizard-shaped lures. The mold was placed in a refrigerator for about 15 minutes to rapidly obtain a firm gel. The solidified lures were removed from the molds. Freshly prepared lures were brittle and did not remain on the hook well. Curing by storing at ambient temperature for 48 hours gave a tougher while still flexible lure. This lure shrinks by about 10% in size and 20% in weight.

Analysis was conducted by holding the lures in a controlled environment for two hours at a temperature of 150° F. The lure held at this temperature without melting. The lure hooks well, becomes slimy when moistened, swells when hydrated, and becomes more "wiggly" during fishing. The tensile strength of the lure was comparable of that of the plastic lures on the market when tested on the Instron Universal Testing Instrument using manual grips.

EXAMPLE 6

A formulation of the following composition was prepared:

| Component | Amount |
| --- | --- |
| Water | 40 g |
| Sucrose | 10 g |
| Gelatin (200–300 bloom) | 14.2 g |
| Sodium Alginate | 3.0 g |
| Calcium chloride ($CaCl_2$) | 0.5 g |
| Starch | 2.0 g |
| Sodium Metaphosphate | 1.0 g |
| Corn Syrup | 25 g |
| Glycerin | 2 g |
| Food coloring | trace |

Manufacturing Procedure: All ingredients are weighed prior to processing. The water was brought to a boil while the other ingredients were dry blended. The mixing vessel was charged with the hot water. The dry ingredients were added to the hot water with lots of mixing. Food coloring was added. Heating with agitation continued until the temperature reached about 90° C. When all components were completely dissolved in solution and the mixture appeared homogeneous, the hot solution was injected using a syringe into an aluminum mold to yield fish-shaped and lizard-shaped lures. The mold was placed in a refrigerator for about 15 minutes to rapidly obtain a firm gel. The solidified lures were removed from the molds. Freshly prepared lures were brittle and did not remain on the hook well. Curing by storing at ambient temperature varies with humidity and may range from about 10–30 hours, and gives a tougher while still flexible lure. This lure shrinks by about 10% in size and 15% in weight.

Analysis was conducted by holding the lures in a controlled environment for two hours at a temperature of 170° F. The lure held at this temperature without melting. The lure hooks well, becomes slimy when moistened, swells when hydrated, and becomes more "wiggly" during fishing. The lure was attached to the hook in the Texas rigging method. The lure was then cast into the water and retrieved. This was repeated until the lure broke and/or became detached. This lure formulation did not detach for more than 20 casts.

Lures, cast from the lizard molds, were prepared. From the head to start of the tail was 5.5 inches long, and tapered. The head was 1.25 inches, the middle of the body was 1.75 inches and the tail was 2.50. The lure was placed in top and bottom grip attachments of an Instron Testing Instrument. The top grip was attached at the end of the head where the legs are attached to the trunk of the body. The bottom grip was attached at the end of the trunk of the body where the legs are attached. A 50 kg load transducer was used for the tensile strength test. The load range was set at five to reduce variability in the testing. A strip chart recorder was employed to record the data. A 1:1 recorder to cross head speed was used for the testing. The cross head moved at a speed of 50 mm per minute. The tensile strength of the lure was comparable of that of the plastic lures on the market when tested on the Instron Universal Testing Instrument using manual grips. The plastic lure bore a load of 0.98 kg and stretched to 123.6 mm before breaking while the test lure was able to bear a load of 1.08 kg and stretched 119.7 mm before breaking.

EXAMPLE 7

Plastic lures made of typical polyvinyl chloride formulations are often found in the stomachs of largemouth bass (*Micropterus salmoides*) from populations that are routinely fished. While no studies have documented that consuming and retaining a plastic lure in stomach can be harmful to a largemouth bass, clearly voiding or digesting the product would reduce the opportunity for obstruction of the stomach or intestine. Lure formulations (example 4 and 6) were force fed to largemouth bass to determine if the lures would be either broken down or voided from the stomach of a fish. In 2 trials Using 6–8 fish per trial, lures placed in the stomachs of fish were completely voided from the stomach within 3–5 days. No adverse reaction by the largemouth bass was noted.

EXAMPLE 8

A formulation of the following composition was prepared:

| Component | Amount |
| --- | --- |
| Water | 513 g |
| Glycerol | 100 g |
| Sucrose | 150 g |
| Gelatin (200–300 bloom) | 150 g |
| Kappa carrageenan | 15 g |

-continued

| Component | Amount |
| --- | --- |
| Potassium chloride (KCl) | 3.5 g |
| Potassium sorbate | 3.0 g |
| Fish food powder | 7.5 g |
| Glitter | 5.0 g |
| Food coloring | 15–20 drops |

Manufacturing Procedure: The mixing vessel was charged with water and glycerol. After thorough mixing, the solution was heated to near boiling temperatures. The other ingredients were dry blended. The dry ingredient mixture was added at one time into the hot water/glycerol solution with lots of stirring. The solution was heated in a closed vessel to a temperature of 90–95° C. At this point, the mixture was homogeneous and fluid. The hot solution was injected manually using a syringe into chilled molds (e.g., lizard-shaped, worm-shaped). Gelation occurred almost instantaneously. The strength of the gel was dependent upon holding time and temperature, increasing as time increased and temperature decreased. The lures were hung vertically to cure at 23° C. and 35–40% relative humidity for approximately 3 h. Cured lures were sprayed with vegetable oil and placed into plastic bags. The lures have strength, flexibility, and stay on the hook during fishing. The lures hold-up under temperatures of 130° C. Informal fishing resulted in bass being caught.

EXAMPLE 9

A formulation of the following composition was prepared:

| Component | Amount |
| --- | --- |
| Water | 102 g |
| Sucrose | 50 g |
| Gelatin (200–300 bloom) | 30 g |
| Kappa carrageenan | 3 g |
| Locust bean gum | 0.5 g |
| Potassium chloride (KCl) | 0.75 g |
| Potassium sorbate | 0.6 g |
| Fish food powder | 1.5 g |
| Glitter | 1.0 g |
| Food coloring | 5–10 drops |

Manufacturing Procedure: The mixing vessel was charged with near-boiling water. The other ingredients were dry blended. The dry ingredient mixture was added at one time into the hot water with lots of stirring. The resultant mixture was much thicker than that of Example 8. The solution was heated in a closed vessel to a temperature of 90–95° C. At this point, the mixture was homogeneous and injectable (it was still thicker than Example 8, making it more difficult to work with). The hot solution was injected manually using a syringe into chilled molds (e.g., lizard-shaped, worm-shaped). Gelation occurred almost instantaneously. The strength of the gel was dependent upon holding time and temperature, increasing as time increased and temperature decreased. The lures were laid flat to cure at 24° C. and 50% relative humidity for approximately 6–8 h. Cured lures were sprayed with vegetable oil and placed into plastic bags. The lures have strength, flexibility, and stay on the hook during fishing. The lures hold-up under temperatures of 130° C. Informal fishing resulted in bass being caught.

EXAMPLE 10

A formulation of the following composition was prepared:

| Component | Amount |
| --- | --- |
| Water | 5 gal |
| Sucrose | 9.2 kg |
| Gelatin (200–300 bloom) | 2.9 kg |
| Kappa carrageenan | 544 g |
| Potassium chloride (KCl) | 114 g |
| Potassium sorbate | 114 g |
| Fish food powder | 151 g |
| Glitter | 151 g |
| Food coloring | 58 mL |

Manufacturing Procedure: Production of lures using the above formulation was done at a commercial soft lure manufacturing to explore the feasability of scaling up the process. The mixing vessel was a 15-gallon stainless steel container, which was able to be pressurized. This vessel also had a valve to allow for injection of sample into the molds. The vessel was equipped with a band heater. Thus, this vessel served to heat, mix, and inject the fluid material. The vessel was charged with water, which was heated to 60–70° C. The other ingredients were dry blended. The dry ingredient mixture was added at one time into the warm water with lots of stirring. The solution was heated in a closed vessel to a minimum temperature of 85° C. (temperature increased during manufacturing. At this point, the mixture was homogeneous and fluid. The hot solution was injected mechanically using pressurized hoses into chilled commercial molds (i.e., lizard-shaped). The injection pressure and hold time were adjusted to yield intact lizards without over-filling the molds (i.e., without flashing). Partial utilization of the batch resulted in the production of 500–600 lizards, which were laid flat on trays to cure. Fresh lures were fragile and needed to be cured. The curing conditions were 24° C. and 15–20% relative humidity for 8–10 hours. These conditions were actually too harsh, and the lures were somewhat over-dried. The cured lures were sprayed with vegetable oil and packaged into plastic bags (10 lizards/bag). The strength of the cured lures was excellent, but flexibility could be improved. However, the major objective of this project was to evaluate potential problems with commercial production. It is apparent that the biodegradable lure formulations can be used with equipment currently used for making plastic lures without significant difficulty.

EXAMPLE 11

A formulation in the proportions of Example 6 was also scaled up, resulting in the production of lures again under commercial manufacturing conditions. The higher viscosity of this formulation required higher pressures during injection, which caused some flashing. Different formulations will each require unique optimization of processing conditions. A variety of lure shapes were prepared successfully. Again, the issues associated with scaling up can be addressed and should not pose significant difficulties.

EXAMPLE 12

A formulation of the following composition was prepared:

| Component | Amount |
| --- | --- |
| Water | 63.0 mL |
| Corn Syrup | 35 g |
| Glycerin | 2.3 g |
| Sucrose | 10 g |
| Gelatin (200–300 bloom) | 14.2 g |
| Sodium Alginate | 3.0 g |
| Calcium chloride (CaCl$_2$) | 0.4 g |
| Starch | 2.0 g |
| Sodium Metaphosphate | 1.0 g |
| Locust Bean Gum | 1.0 g |
| Sodium Benzoate | 1.0 g |
| Food coloring | trace |
| Flavoring | trace |

Manufacturing Procedure: All ingredients are weighed prior to processing. The water was brought to a boil while the other ingredients were dry blended. The mixing vessel was charged with the hot water. The dry ingredients were added to the hot water with lots of mixing. Food coloring was added. Heating with agitation continued until the temperature reached about 90° C. When all components were completely dissolved in solution and the mixture appeared homogeneous, the hot solution was injected using a syringe into an aluminum mold to yield fish-shaped and lizard-shaped lures. The mold was placed in a refrigerator for about 15 minutes to rapidly obtain a firm gel. The solidified lures were removed from the molds. Curing by storing at ambient temperature varies with humidity and may range from about 10–30 hours, and gives a tougher while still flexible lure. This lure shrinks by about 10% in size and 15% in weight.

Analysis was conducted by holding the lures in a controlled environment for two hours at a temperature of 170° F. The lure held at this temperature without melting. The lure hooks well, becomes slimy when moistened, swells when hydrated, and becomes more "wiggly" during fishing. The lure was attached to the hook in the Texas rigging method. The lure was then cast into the water and retrieved. This was repeated until the lure broke and/or became detached. This lure formulation did not detach for more than 20 casts.

Lures, cast from the lizard molds, were prepared. From the head to start of the tail was 5.5 inches long, and tapered. The head was 1.25 inches, the middle of the body was 1.75 inches and the tail was 2.50. The lure was placed in top and bottom grip attachments of an Instron Testing Instrument. The top grip was attached at the end of the head where the legs are attached to the trunk of the body. The bottom grip was attached at the end of the trunk of the body where the legs are attached. A 50 kg load transducer was used for the tensile strength test. The load range was set at five to reduce variability in the testing. A strip chart recorder was employed to record the data. A 1:1 recorder to cross head speed was used for the testing. The cross head moved at a speed of 50 mm per minute. The tensile strength of the lure was comparable of that of the plastic lures on the market when tested on the Instron Universal Testing Instrument using manual grips. The plastic lure bore a load of 0.98 kg and stretched to 123.6 mm before breaking while the test lure was able to bear a load of 1.08 kg and stretched 119.7 mm before breaking. A texture profile analysis was also completed using the Instron Universal testing instrument. Two factors were identified in the profile: hardness and springness. The plastic lure had a hardness factor of 1.05 and a springness factor of 100%. The test lure had a hardness factor of 1.25 and a springness factor of 91%.

While the invention has been described with reference to preferred and example embodiments, it will be understood by those skilled in the art that a number of modifications, additions and deletions are within the scope of the invention, as defined by the following claims.

What is claimed is:

1. A biodegradable fishing lure comprising a body formed of a flexible and resilient material, said material being biodegradable, digestible by aquatic wildlife, and formed of all natural, water-soluble ingredients, wherein the body is molded into the general shape of a natural food source of a fish, and wherein said material comprises sucrose, gelatin, sodium alginate, locust bean gum, calcium chloride, starch, corn syrup, glycerin, sodium benzoate and sodium metaphosphate.

2. The biodegradable fishing lure of claim 1, wherein said material further comprises at least one fish attractant.

3. The biodegradable fishing lure of claim 2, wherein the at least one fish attractants comprises hydrolyzed fish protein, fish oil, fish meal, ground crustaceans, ground mussels, fish powder, fruit, spices, garlic, garlic oil, neutral L-amino acids, betaine, nucleotides, inosine, inosine-5-monophosphate, sulfonium compounds, dimethylthetin, dimethylpropiothetin, metallized glitter, metallic glitter and/or food grade colors.

4. The biodegradable fishing lure of claim 1, comprising about 5–15% sucrose, about 10–30% gelatin, about 1–5% sodium alginate, about 1–5% locust bean gum, about 0.1–1% calcium chloride, about 1–5% starch, about 30–50% corn syrup, about 1–5% glycerin, about 1–3% sodium benzoate and about 1–3% sodium metaphosphate.

5. The biodegradable fishing lure of claim 1, further comprising at least one hook attached to said body.

6. The biodegradable fishing lure of claim 1, further comprising water.

7. The biodegradable fishing lure of claim 1, wherein said body comprises a homogeneous mixture of ingredients throughout, without any insoluble reinforcing matrix.

8. A biodegradable fishing lure comprising:
a body formed of a material comprising sucrose, gelatin, sodium alginate, locust bean gum, calcium chloride, starch, corn syrup, glycerin, sodium benzoate and sodium metaphosphate, said material being digestible by aquatic wildlife, wherein said body is molded into the general shape of an animal; and
at least one hook attached to said body.

9. The biodegradable fishing lure of claim 8, wherein said body comprises a homogeneous mixture of ingredients throughout, without any insoluble reinforcing matrix.

10. The biodegradable fishing lure of claim 8, wherein said body further comprises at least one fish attractant.

11. The biodegradable fishing lure of claim 10, wherein the at least one fish attractants comprises hydrolyzed fish protein, fish oil, fish meal, ground crustaceans, ground mussels, fish powder, fruit, spices, garlic, garlic oil, neutral L-amino acids, betaine, nucleotides, inosine, inosine-5-monophosphate, sulfonium compounds, dimethylthetin, dimethylproplothetin, metallized glitter, metallic glitter and/or food grade colors.

12. A biodegradable fishing lure comprising:
a unitary molded body formed of natural, water-soluble materials comprising sucrose, gelatin, sodium alginate, locust bean gum, calcium chloride, starch, corn syrup, glycerin, sodium benzoate and sodium metaphosphate, wherein substantially the entire unitary body is biodegradable and digestible by aquatic wildlife; and
at least one hook attached to said unitary molded body.

13. The biodegradable fishing lure of claim 12, wherein said unitary molded body comprises a homogeneous mixture of ingredients throughout, without any insoluble reinforcing matrix.

14. The biodegradable fishing lure of claim 12, further comprising a visual attractant in or on said unitary molded body.

15. The biodegradable fishing lure of claim 12, wherein said unitary molded body further comprises at least one fish attractant.

16. The biodegradable fishing lure of claim 15, wherein the at least one fish attractants comprises hydrolyzed fish protein, fish oil, fish meal, ground crustaceans, ground mussels, fish powder, fruit, spices, garlic, garlic oil, neutral L-amino acids, betaine, nucleotides, inosine, inosine-5-monophosphate, sulfonium compounds, dimethylthetin, dimethylproplothetin, metallized glitter, metallic glitter and/or food grade colors.

17. A biodegradable fishing lure comprising a flexible and resilient body and at least one hook secured to the body; said body being formed of all natural materials comprising sucrose, gelatin, sodium alginate, locust bean gum, calcium chloride, starch, corn syrup, glycerin, sodium benzoate and sodium metaphosphate said body comprising a homogeneous mixture of water-soluble ingredients throughout, without any insoluble reinforcing matrix; substantially the entire body being biodegradable and digestible by aquatic wildlife; and said body being molded into the general shape of an animal.

18. The biodegradable fishing lure of claim 17, wherein said body further comprises at least one fish attractant.

19. The biodegradable fishing lure of claim 18, wherein said at least one fish attractant comprises hydrolyzed fish protein, fish oil, fish meal, ground crustaceans, ground mussels, fish powder, fruit, spices, garlic, garlic oil, neutral L-amino acids, betaine, nucleotides, inosine, inosine-5-monophosphate, sulfonium compounds, dimethylthetin, dimethylpropiothetin, metallized glitter, metallic glitter and/or food grade colors.

* * * * *